(12) United States Patent
Zhang

(10) Patent No.: US 12,311,866 B1
(45) Date of Patent: May 27, 2025

(54) LOW-VOLUME MULTI-CHAMBERED AIRBAG

(71) Applicant: ZF Passive Safety Systems US Inc., Washington, MI (US)

(72) Inventor: Songwei Zhang, Troy, MI (US)

(73) Assignee: ZF Passive Safety Systems US Inc., Washington, MI (US)

( * ) Notice: Subject to any disclaimer, the term of this patent is extended or adjusted under 35 U.S.C. 154(b) by 0 days.

(21) Appl. No.: 18/598,335

(22) Filed: Mar. 7, 2024

(51) Int. Cl.
| | |
|---|---|
| *B60R 21/233* | (2006.01) |
| *B60R 21/013* | (2006.01) |
| *B60R 21/205* | (2011.01) |
| *B60R 21/26* | (2011.01) |
| *B60R 21/01* | (2006.01) |

(52) U.S. Cl.
CPC .......... *B60R 21/233* (2013.01); *B60R 21/013* (2013.01); *B60R 21/205* (2013.01); *B60R 21/26* (2013.01); *B60R 2021/01211* (2013.01); *B60R 2021/23308* (2013.01); *B60R 2021/23324* (2013.01)

(58) Field of Classification Search
CPC ..... B60R 21/233; B60R 21/013; B60R 21/26; B60R 21/01; B60R 21/203; B60R 21/205; B60R 21/206; B60R 21/207; B60R 21/231; B60R 2021/01211; B60R 2021/23308; B60R 2021/23115; B60R 2021/23324
USPC .......... 280/729, 743.1, 738, 732, 731, 730.2
See application file for complete search history.

(56) References Cited

U.S. PATENT DOCUMENTS

| | | | |
|---|---|---|---|
| 2011/0101655 A1* | 5/2011 | Ishida | .................... B60R 21/231 280/729 |
| 2020/0282943 A1* | 9/2020 | Lee | ........................ B60R 21/233 |

* cited by examiner

*Primary Examiner* — Keith J Frisby
(74) *Attorney, Agent, or Firm* — Tarolli, Sundheim, Covell & Tummino LLP

(57) ABSTRACT

An apparatus for helping to protect an occupant of a vehicle includes an airbag configured to be mounted at a mounting location on a vehicle mounting structure. The airbag includes a front wall configured to receive the occupant, inflatable sidewalls connected to the front wall, and an inflatable rear cushion. The sidewalls are configured to extend from the front wall to a throat of the airbag at the mounting location. The front wall and the sidewalls delimit a non-inflatable central space located behind the front wall and between the sidewalls. The rear cushion is positioned in the central space between the throat and the front wall.

21 Claims, 8 Drawing Sheets

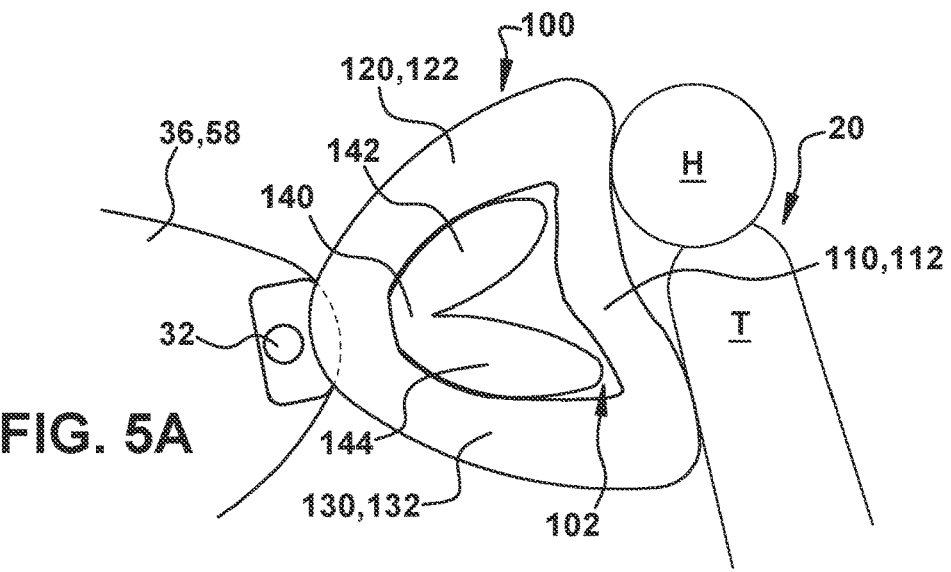
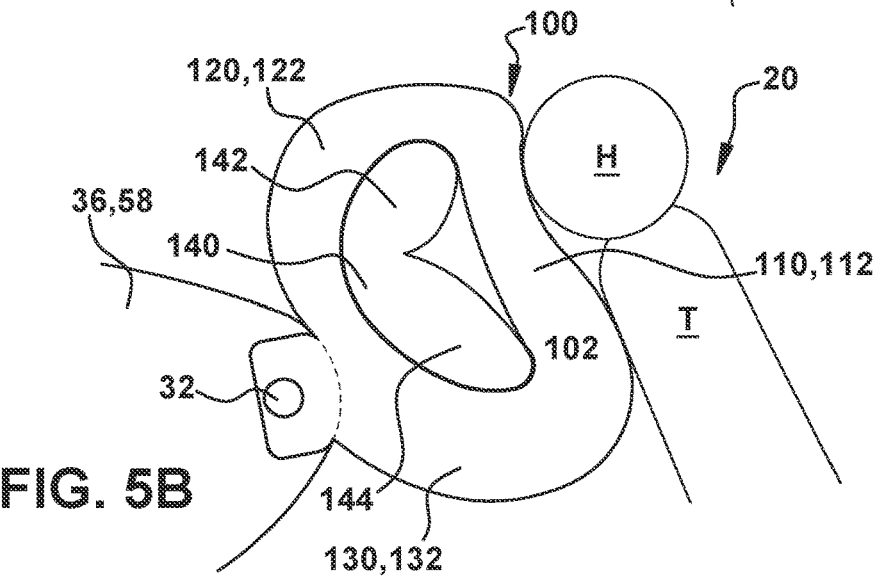
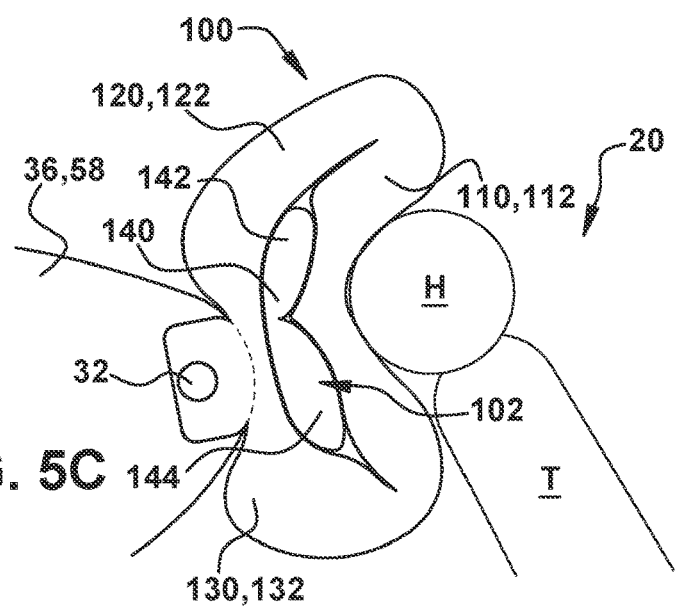

LOW-VOLUME MULTI-CHAMBERED AIRBAG

TECHNICAL FIELD

This disclosure relates to an apparatus for helping to protect an occupant of a vehicle. More particularly, this disclosure relates to an airbag that is inflatable between a vehicle surface and a vehicle occupant, and that has a multi-chambered, low-volume configuration.

BACKGROUND

It is known to provide an inflatable vehicle occupant protection device, such as an airbag, for helping to protect an occupant of a vehicle. One particular type of airbag is a frontal airbag configured to deploy in front of a seated occupant to an inflated condition in which the airbag is positioned between the occupant and vehicle structure that supports the airbag. Depending on the configuration of the vehicle and the seat position with which the airbag is associated, the airbag can help protect the occupant from impacts with parts of the vehicle such as a steering wheel, an instrument panel, or a seat of an adjacent row of vehicle seating.

For example, for front-row seating, driver frontal airbags inflate between the steering wheel and the occupant of a driver seat of the vehicle, and passenger frontal airbags inflate between the instrument panel and the occupant of a passenger side seat of the vehicle. In second row, third row, etc. seats, frontal airbags inflate between the occupant and the seat of the forward adjacent seating row.

Front row passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated position. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated position. The airbag cover opens as a result of forces exerted on the cover by the inflating driver airbag.

Second row, third row, etc. airbags are typically stored in a deflated condition in a cover/housing that is mounted to the seat (e.g., seatback) of the forward adjacent seating row. The cover/housing, as well as the upholstery of the seat upon which the airbag is mounted, help enclose and conceal the airbag in a stored condition. The inflating airbag exerts deployment forces on the housing/cover/upholstery, resulting in an opening and/or tearing that permits the airbag to deploy to an inflated position.

Inflatable vehicle occupant protection devices also include airbags for providing side protection, such as side airbags mounted in a seat or side door, and curtain airbags mounted in or along the vehicle roof. Inflatable knee bolster airbags can inflate in a footwell of the vehicle to help protect the occupant's knees and lower legs.

To achieve their intended purposes, airbags need to occupy a certain volume of space, at a certain degree of pressurization, within a certain amount of time. All of these factors vary with the specifics of the implementation. For example, front row passenger frontal airbags are typically required to occupy a large volume of space between the passenger and the instrument panel, whereas side airbags are typically required to occupy a comparatively small volume of space between the passenger and, for example, the side structure of the vehicle. Due, however, to their positions and the distance between the occupant and the structure between which the airbags inflate, side airbags must be inflated and deployed comparatively quicker than frontal airbags.

SUMMARY

An airbag has a low-volume, multi-chambered configuration in which it occupies a volume of space that is larger than the sum of the chamber volumes. The chambers are configured to inflate to different pressures so that high pressure chamber(s) cushion occupant impacts through chamber deflection, whereas low pressure chambers cushion occupant impacts through fluid displacement.

An apparatus for helping to protect an occupant of a vehicle includes an airbag configured to be mounted at a mounting location on a vehicle mounting structure. The airbag includes a front wall configured to receive the occupant, inflatable sidewalls connected to the front wall, and an inflatable rear cushion. The sidewalls are configured to extend from the front wall to a throat of the airbag at the mounting location. The front wall and the sidewalls delimit a non-inflatable central space located behind the front wall and between the sidewalls. The rear cushion is positioned in the central space between the throat and the front wall.

According to one aspect, the front wall can be configured to be displaced toward the rear cushion in response to receiving the occupant and wherein the rear cushion is configured to dampen the movement of the front wall and the occupant.

According to another aspect, the front wall can be configured to close the central space when it is displaced toward the rear cushion.

According to another aspect, the sidewalls can be configured to bend and deflect in response to the front wall being displaced toward the rear cushion. The bending and deflection of the sidewalls can be configured to dampen displacement of the front wall.

According to another aspect, the sidewalls can be configured to be inflated to a first pressure, and the rear cushion can be configured to be inflated to a second pressure that is substantially less than the first pressure. According to one aspect, the first pressure can be about 20-50 psi and the second pressure can be about 1-5 psi. More specifically, according to an aspect, the first pressure can be about 30 psi and the second pressure can be about 1 psi.

According to another aspect, the throat can be configured to direct a first volume of inflation fluid into the sidewalls and a second volume of inflation fluid into the rear cushion. The first and second volumes can be configured to produce the first and second pressures.

According to another aspect, the apparatus can also include an inflator that is actuatable to provide inflation fluid for inflating the airbag. The inflator can be configured to discharge a first volume of inflation fluid into the sidewalls and a second volume of inflation fluid into the rear cushion. The first and second volumes can be configured to produce the first and second pressures.

According to another aspect, the apparatus can also include an inflator that is actuatable to provide inflation fluid for inflating the airbag. The inflator can include first and second actuatable stages. The first stage can be to discharge a first volume of inflation fluid into the sidewalls. The second stage can be configured to discharge a second volume of inflation fluid into the rear cushion. The first and second volumes can be configured to produce the first and second pressures.

According to another aspect, the front wall can be inflatable and configured to be in fluid communication with the sidewalls. The front wall can be inflatable with inflation fluid received from the sidewalls.

According to another aspect, the front wall can include a plurality of inflatable front chambers. The sidewalls can include a plurality of inflatable side chambers.

According to another aspect, the front chambers can be elongated, tubular, and extend parallel to each other. The side chambers can be elongated, tubular, and extend parallel to each other.

According to another aspect, the rear cushion can include an inflatable first rear chamber positioned adjacent to a sidewall and an inflatable second rear chamber inflatable adjacent to another sidewall.

According to another aspect, the first and second rear chambers can be configured to dampen movement of the front wall through at least one of inflation fluid displacement and venting in response to the front wall being displaced into engagement with the rear cushion.

According to another aspect, the first and second rear chambers can be configured to move away from each other in response to the front wall being displaced into engagement with the rear cushion.

According to another aspect, the rear chamber can have a shape and volume configured to tailor fluid displacement in response to an impact in order to cushion the impact.

According to another aspect, the front wall can include a non-inflatable sheet of material. The sidewalls can be configured when inflated to tension the front wall.

According to another aspect, the airbag can be a passenger frontal airbag configured to be mounted in or on a vehicle instrument panel. One of the sidewalls can be configured to extend generally upward and rearward in the vehicle. Another of the sidewalls can be configured to extend generally downward and rearward in the vehicle. The front wall can be configured to extend generally vertically in the vehicle from the sidewalls.

According to another aspect, an airbag module can include the airbag according to any of the preceding aspects. The airbag module can also include an inflator for inflating the airbag, and a housing for supporting the inflator and the airbag in a deflated and stored condition.

According to another aspect, a vehicle safety system can include the airbag module. The vehicle safety system can also include at least one crash sensor, and a controller configured to control the actuation of the inflator in response to the at least one crash sensor.

DRAWINGS

The foregoing and other features of the present invention will become apparent to one skilled in the art to which the subject disclosure relates upon consideration of the following description with reference to the accompanying drawings, in which:

FIGS. 5A-5C are schematic views illustrating the operation of the low-volume multi-chamber airbag.

DESCRIPTION

Figure 1:
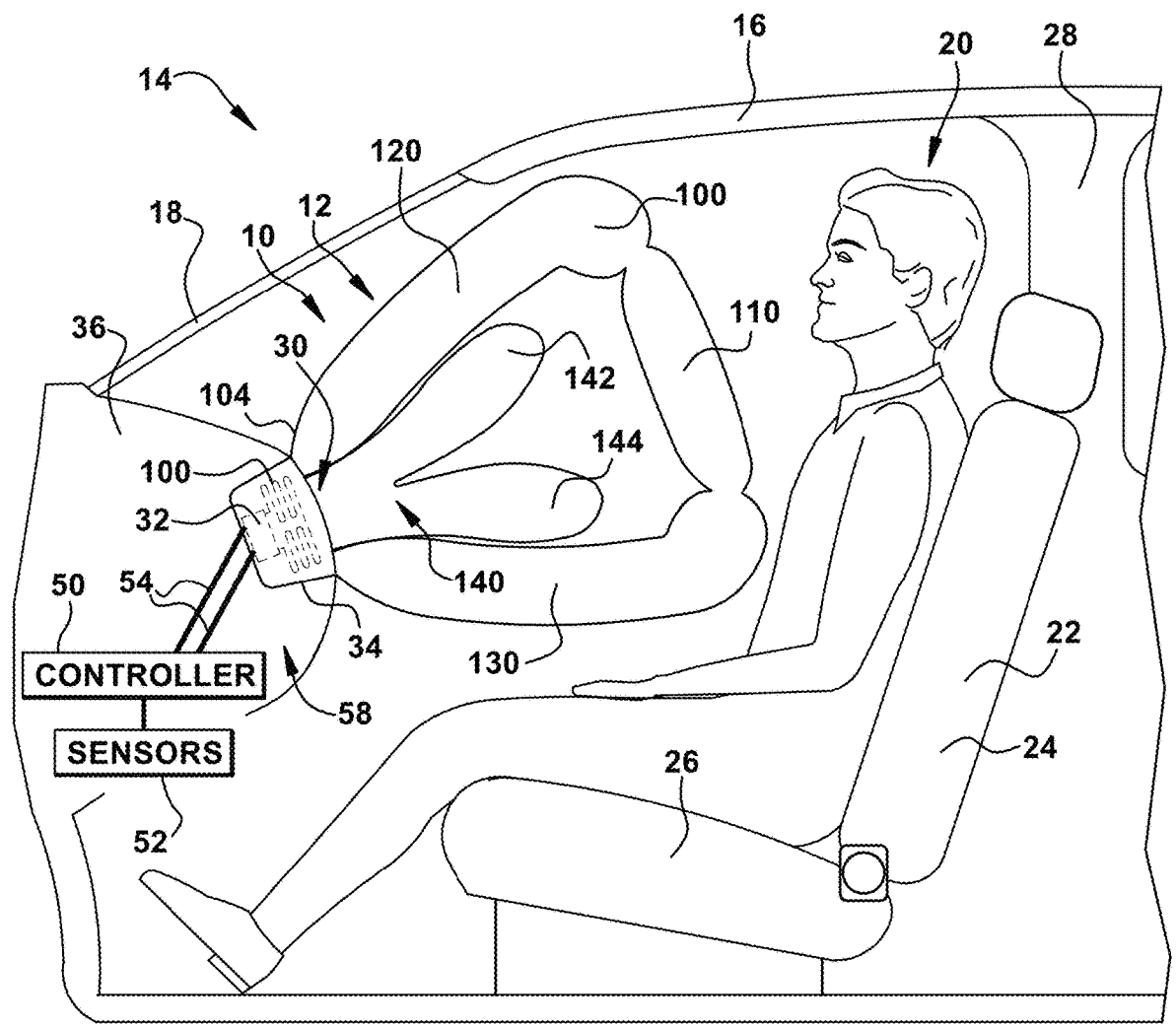
FIG. 1 is a schematic side view illustrating an apparatus for helping to protect an occupant of a vehicle, including a low-volume multi-chamber airbag, according to one example configuration.

FIG. 1 illustrates an example configuration of a vehicle safety system 10 and apparatus 12 for helping to protect an occupant 20 of a vehicle 14. The system and apparatus 12 include an inflatable vehicle occupant protection device 100, in the form of an airbag. In the example configuration of FIG. 1, the airbag 100 is a passenger frontal airbag for helping to protect the occupant 20 of a front vehicle seat 22 on a passenger side of the vehicle 14. The apparatus 12 can, however, be configured to protect occupants of different seating positions, such as an occupant of a driver seat or an occupant of a rear seat ($2^{nd}$ row, $3^{rd}$ row, etc.). Additionally, the apparatus can be configured for protection other than frontal protection, such as side protection (e.g., side airbags) or knee airbags.

The airbag 100 can be part of an airbag module 30 that includes an inflator 32 and a support or housing 34 for the airbag and inflator. The airbag 100 has a stored condition, indicated by dashed lines in FIG. 1, in which the airbag is folded and placed in the housing 34. The airbag module 30 is mounted to a vehicle mounting structure 58, such as the instrument panel 36 as shown in the example configuration of FIG. 1. The airbag module 30 can face toward or in the general direction of the occupant 20 (e.g., upward and rearward as shown in FIG. 1) so that the airbag 100 can deploy to the desired position.

The housing 34 helps contain and support the airbag 100 and inflator 32 in/on the mounting structure 58. In the example configuration, the mounting structure 58 is the instrument panel 36. Alternatively, in a driver airbag configuration, the mounting structure 58 can be a steering wheel (not shown) of the vehicle 14. In a rear seat protection configuration, the mounting structure 58 can be a seatback of the seat in front of the occupant. In a side airbag configuration, the mounting structure 58 can be the seat back 24, seat base 26, side structure 28 (e.g., door or pillar), or a center console (not shown). In a knee airbag configuration, the mounting structure 58 can be the instrument panel 36, facing down into the footwell toward the occupant's lower legs and feet.

The inflator 32 is actuatable to provide inflation fluid to an inflatable volume of the airbag 100 to deploy the airbag to the inflated condition. The inflator 32 can be of any known type, such as stored gas, solid propellant, augmented or hybrid. The apparatus 12 also includes a controller, illustrated schematically at 50, for providing an actuation signal to the apparatus 12 in signals from sensors 52 responsive to a crash event. The sensors 52 can include crash sensors, such as accelerometers for sensing vehicle crash conditions. The sensors 52 can also include condition sensors for sensing vehicle and/or occupant conditions, such as seat weight sensors, seat position sensors, seatbelt buckle latch sensors, and occupant presence sensors. The inflator 32 is operatively connected to the controller 50 via lead wires 54.

The controller 50 can provide the actuation signal to the inflator 32 in response to one or more of the sensors 52 detecting the occurrence of a vehicle crash event. At the same time, the controller 50 can tailor airbag deployment in response to vehicle and/or occupant conditions determined via the sensors 52. For example, if the condition sensors 52 determine a condition, such as a full-forward seat position, an unbuckled occupant, or the presence of a small occupant positioned close to the instrument panel 36 and/or airbag 100, the controller 50 can cause a vent to be placed in the opened condition when the airbag is deployed, or can activate a single stage of a two-stage or multi-stage inflator.

The airbag 100 can be constructed of any suitable material, such as nylon, e.g., woven nylon 6-6 yarns, and can be constructed in any suitable manner. For example, the airbag 100 can include one or more pieces or panels of material. If more than one piece or panel is used, the pieces or panels can be interconnected by known means, such as stitching, ultrasonic welding, heat bonding, or adhesives, to form the airbag. The airbag 100 can be uncoated, coated with a material, such as a gas impermeable urethane, or laminated with a material, such as a gas impermeable film. The airbag 100 thus can have a gas-tight or substantially gas-tight construction. Those skilled in the art will appreciate that alternative materials, such as polyester yarn, and alternatives coatings, such as silicone, can also be used to construct the airbag 100.

Upon sensing the occurrence of an event for which inflation of the airbag 100 is desired, such as a vehicle collision, the sensors 52 provide a signal to the controller 50, which actuates the inflator 32 via the lead wires 54. Upon receiving the signal from the controller 50, the inflator 32 is actuated and provides inflation fluid to the inflatable volume of the airbag 100 in a known manner. The airbag 100 inflates towards the occupant 20 from the stored condition to an inflated and deployed condition illustrated in FIG. 1. The airbag 100, while inflated, helps protect the vehicle occupant 20 from impacts with parts of the vehicle 14, such as the instrument panel 36, cushions the occupant, and helps provide a desired ride-down effect.

Figure 2:
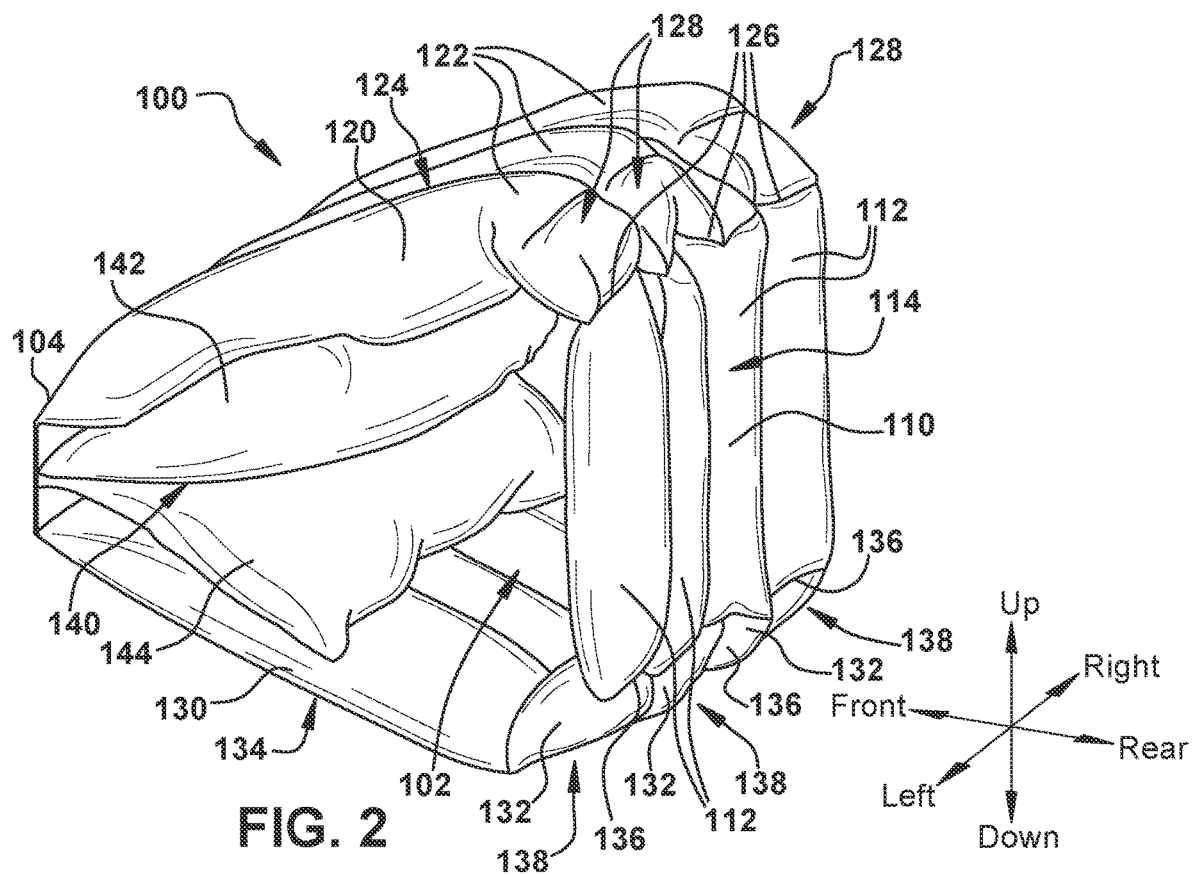
FIG. 2 is a perspective view of the low-volume multi-chamber airbag.
Figure 3:
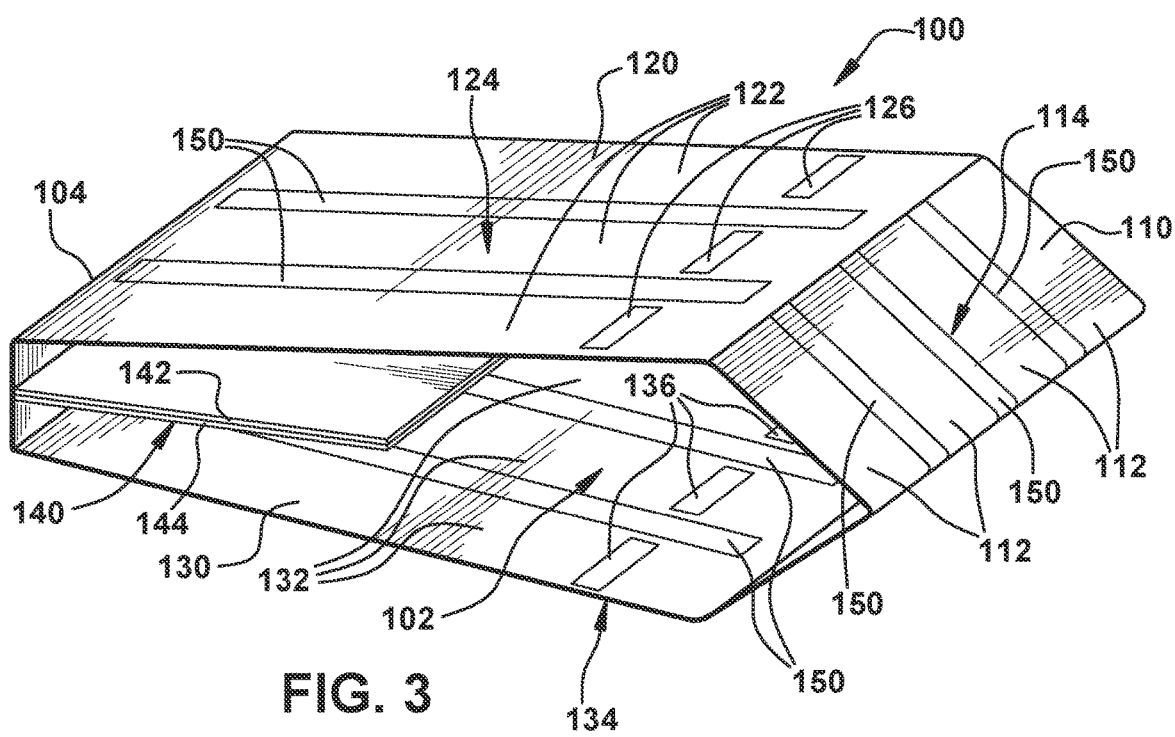
FIG. 3 is a schematic perspective view of the low-volume multi-chamber airbag in a deflated and flattened condition.

Referring to FIGS. 1-3, the airbag 100 has a low-volume multi-chambered configuration. The low-volume aspect of the configuration is owed to the airbag 100 including inflatable walls, each of which are formed by inflatable chambers. The inflatable walls leave a central space 102 that is outside the inflatable volume of the airbag 100 yet bounded by the inflatable walls.

The inflatable walls of the airbag include a front wall 110, a first sidewall 120, and a second sidewall 130. The front wall 110 has an outer surface presented to the occupant 20 of the vehicle seat 22. In the example configuration of FIG. 1, the first sidewall 120 is a top wall of the airbag 100 having an outer surface facing upward in the vehicle 14. The second sidewall 130 is a bottom wall of the airbag 100 having an outer surface facing downward in the vehicle 14. The first sidewall 120 extends from an upper end of the front wall 110 toward the airbag mounting location which, in the example configuration of FIG. 1, is the instrument panel 36. The second sidewall 130 extends from a lower end of the front wall 130 toward the airbag mounting location, where it meets the upper wall 120.

The front wall 110, first sidewall 120, and second sidewall 130 are arranged in a closed, generally triangular configuration, as shown in FIG. 1, with the space 102 being bounded by the walls extending laterally with respect to the vehicle 14, vehicle seat 22, and occupant 20 across a width of the airbag 100. Inner surfaces of the front wall 110 and sidewalls 120, 130, face opposite their respective outer surfaces, toward the space 102.

The airbag 100 also includes a rear cushion 140 positioned adjacent the mounting location 36, 58 and the location where ends of the upper wall 120 and lower wall 130 converge and meet. The space 102 is positioned between the front wall 110 and the rear cushion 140. The rear cushion 140 further defines/delimits the space 102, extending the width of the airbag 100 and being positioned opposite the front wall. The rear cushion 140 can have a bifurcated or lobed configuration with a first rear chamber 142 that extends at least partially along the first sidewall 120, and a second rear chamber 144 that extends at least partially along the second sidewall 130. The first and second rear chambers 142, 144 can be separate chambers or can be formed by delimiting a singular rear cushion 140, for example, with stitching, tethers, or other connections, such as ultrasonic or laser welding, or via a one-piece woven ("OPW") construction.

The front wall 110 includes a plurality of longitudinally extending front chambers 112 that are arranged side-by-side across a width of the airbag 100. The front chambers 112 extend parallel to each other, generally vertically in the vehicle 14, albeit at an angle, so that a front, occupant receiving surface 114 of the airbag 100 is presented at a desired orientation, such as one configured to be flush with an occupant moving forward in response to a frontal vehicle collision into contact with the airbag 100.

The first sidewall 120 includes a plurality of longitudinally extending side chambers 122 that are arranged side-by-side across a width of the airbag 100. The side chambers 122 extend parallel to each other, generally diagonally downward in the vehicle 14 from the upper portion of the front wall 110 toward the mounting structure 58, so that an upper surface 124 of the airbag 100 is presented at a desired orientation, such as upward/forward in the vehicle 14 toward a roof 16 and/or windshield 18.

The second sidewall 130 includes a plurality of longitudinally extending side chambers 132 that are arranged side-by-side across a width of the airbag 100. The side chambers 132 extend parallel to each other, generally horizontally or diagonally upward in the vehicle 14 from the lower portion of the front wall 110 toward the mounting structure 58, so that a lower surface 134 of the airbag 100 is presented at a desired orientation, such as downward in the vehicle 14 toward a lap or upper legs of the occupant 20 or toward and along a surface of the mounting structure 58, such as along the instrument panel 36.

The front chambers 112 and side chambers 122, 132 can be positioned directly adjacent to each other, or can be spaced from each other by non-inflatable portions of their respective airbag walls 110, 120, 130 where the overlying layers of the walls are interconnected. The delimiting between chambers can be achieved in a variety of manners. Areas where the layers are interconnected to define delimiting between chambers are shown generally at 150 in FIG. 3. The size and shapes of the areas 150 is shown for illustration purposes only. These areas 150 can be formed in a variety of manners and in a variety of shapes/configurations. For example, the areas 150 delimiting the adjacent chambers 112, 122, 132 can be formed in the following manners:

For a stitched airbag construction, the chambers can be formed/delimited by a single line of stitching or multiple lines of stitching that are closely spaced and interconnect the overlying panels of the airbag walls.

For an ultrasonic or laser welded construction, the chambers can be formed/delimited by a narrow strip of welded material interconnecting the overlying panels of the airbag walls.

For an OPW construction, the chambers can be formed/delimited by a narrow strip or region where the overlying panels of the airbag walls are interwoven.

Similarly, the areas 150 delimiting the adjacent chambers 112, 122, 132 can be delimited as follows:

For a stitched airbag construction, the chambers can be formed/delimited by multiple lines of stitching that interconnect the overlying panels of the airbag walls, and that are spaced apart from each other so that the non-inflated portion between the chambers has a desired width.

For an ultrasonic or laser welded construction, the chambers can be formed/delimited by a strip of welded material that interconnects the overlying panels of the airbag walls, and that defines the non-inflated portion between the chambers having a desired width.

For an OPW construction, the chambers can be formed/delimited by a strip or region where the overlying panels of the airbag walls are interwoven to define the non-inflated portion between the chambers having a desired width.

The first sidewall 120, second sidewall 130, and rear cushion 140 meet the at a throat 104 of the airbag 100, where the airbag is connected to the inflator 32. The throat 104 provides fluid communication between the inflator and the side chambers 122 of the first sidewall 120, the side chambers 132 of the second sidewall 130, and the chambers 142, 144 of the rear cushion 140. The throat 104 can also allow for pivoting movement of the airbag 100 up and down about the inflator 32. The front chambers 112 of the front wall 110 are fluidly connected to the inflator 32 via the first sidewall 120 and second sidewall 130. The fluid connection between front chamber 112 and side chamber 122 can be throttled to allow different pressure between the chamber 112 and chamber 122. The same throttle can also be applied between front chamber 112 and side chamber 132.

The airbag 100 can provide coverage commensurate with conventional airbag constructions. In the example configuration of FIG. 1, the airbag 100 can provide coverage commensurate with that of conventional front seat passenger airbags. Similar coverage commensurate with conventional airbag designs can be provided in configurations of the airbag in a driver airbag implementation, a rear seat airbag implementation, a side airbag implementation, or a knee airbag implementation.

The utilization of the airbag walls 110, 120, 130 and rear cushion 140 to define the central space 102 outside the inflatable volume of the airbag 100 is advantageous because the inflated volume of the airbag is reduced. As a result, the size of the inflator 32 can be reduced while, at the same time, the deployment time for the airbag 100 can be optimized. All of this can be achieved while still affording the same level of protection provided by conventional airbag designs. This is made possible through the chambered design of the airbag walls 110, 120, 130, in combination with the design of the rear cushion 140.

Normally, with a conventional airbag that fills the entire space bounded by its outer surface, the airbag is inflated to a single pressure throughout the inflatable volume. In these conventional airbag configurations, the cushioning and ride down effect provided by the airbag is produced by venting or otherwise allowing the inflation fluid to be displaced within the inflatable volume and/or expelled/vented from the inflatable volume.

The system 10 and/or apparatus 12 can be configured to inflate the chambers of the airbag walls and the rear cushion to different pressures configured to tune the occupant protecting performance of the airbag 100. Specifically, the airbag walls/chambers are configured, through their respective structural configurations and levels of pressurization, to cushion/ride-down the impacting occupant in two manners. According to the first manner, the airbag cushions/rides-down the impacting occupant through deflection against a resilient support in the manner, for example, of deflecting a spring. According to the second manner, the airbag cushions/rides-down the impacting occupant through fluid displacement within the inflatable volume of the airbag 100, in the manner, for example, of a pillow, i.e., in a manner similar to conventional airbags. To do so, the system 10/apparatus 12 is configured to inflate the chambers of the walls and rear cushion to different pressures selected so that the chambers provide occupant cushioning/ride-down through both resilient deflection and fluid displacement.

The front chambers 112 of the front wall 110 and the side chambers 122, 132 of the sidewalls 120, 130 are configured to be inflated to a high pressure compared to the pressure of the rear chambers 142, 144 of the rear cushion 140. The sidewalls 120, 130 are responsible for a majority of the deflection that contributes to the occupant cushioning/ride-down effect of the airbag 100. The front wall 110 serves to receive the impacting occupant 20 and is not necessarily inflated to a pressure as high as the sidewalls 120, 130. The front wall 110 can, however, be inflated to a pressure equal to or on par with the pressurization of the sidewalls 120, 130.

The rear cushion 140 is configured to provide occupant cushioning/ride-down through fluid displacement. As such, the rear chambers 142, 144 of the rear cushion 140 are inflated to pressures that are less than, or much less than, that of the sidewalls 120, 130. Additionally, the rear chambers 142, 144 can have sizes, shapes, configurations, etc. that are configured to produce the desired cushioning/ride-down characteristics. For example, the rear cushion 140 can include a single rear cushion or more than two rear cushions. Additionally, the rear cushion(s) can have shapes that differ from those shown, again with the intent to produce the desired cushioning and/or ride-down effects.

For example, the front chambers 112 of the front wall 110 and the side chambers 122, 132 of the sidewalls 120, 130 can be inflated to a pressure in the range of 20-50 psi, whereas the rear chambers 142, 144 of the rear cushion can be inflated to a pressure in the range of 1-5 psi. In one example implementation of the airbag 100, the chambers 112 of the front wall 110 and the chambers 122, 132 of the sidewalls 120, 130 can be configured to inflate to a pressure of about 30 psi, and the chambers 142, 144 of the rear cushion 140 can be inflated to a pressure in the range of about 1 psi.

Figure 4A:
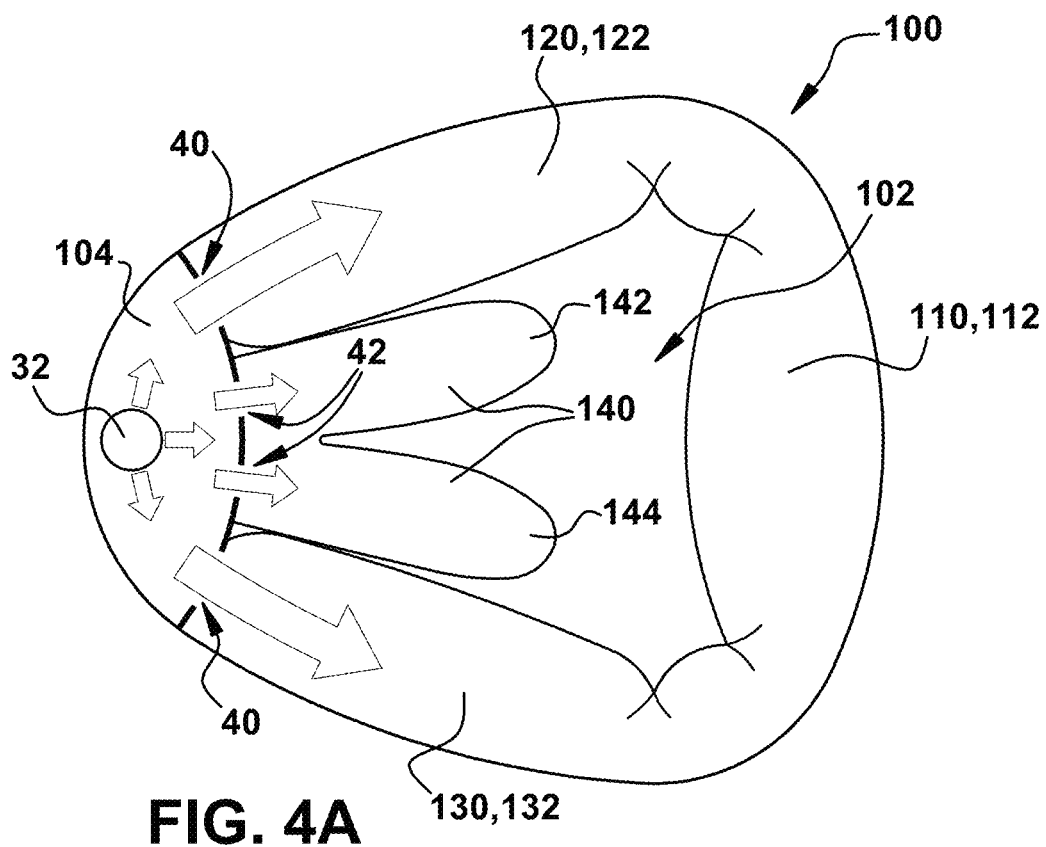
FIGS. 4A and 4B are schematic views illustrating alternative example configurations of fluid distribution in the low-volume multi-chamber airbag of FIGS. 1-3.

The differential in chamber pressurization can be achieved in a variety of manners. For example, referring to FIG. 4A, the airbag 100 can be configured so that the volume of inflation fluid discharged from the inflator 32 is divided to produce a differential in pressurization between the front/sidewalls 110, 120, 130, and the rear cushion 140. To do this, the front chambers 112 and side chambers 122, 132 can be isolated from the rear chambers 142, 144 through the configuration of the airbag 100 so that pressures between the front/sidewalls 110, 120, 130 and the rear cushion 140 will not equalize during the crash event.

Because the first and second sidewalls 120, 130 converge at the throat 104 where the inflator 32 is installed and where the rear cushion 140 is located, the throat 104 can be configured so that the front chambers 112 and side chambers 122, 132 receive a first predetermined volume of inflation fluid and the rear chambers 142, 144 receive a second predetermined volume of inflation fluid. This is shown schematically in FIG. 4A. In this figure, it can be seen that the orifices 40 in the throat 104 through which inflation fluid is directed into the side chambers 122, 132 and thereby into the front chambers 112, are larger than the orifices 42 in the throat that direct inflation fluid into the rear chambers 142, 144. This produces a differential in the volumetric flow/flow rate through the orifices 40, 42, i.e., a large volumetric flow into the side chambers 122, 132 and a comparatively smaller volumetric flow into the rear chambers 142, 144. Keeping in mind that the pressure differentials between the chambers might need only last for less than a second, pressure equalization between the chambers is not a concern because it will not occur until after the crash event, and the cushioning provided by the airbag 100, is complete.

As another example, the side chambers 122, 132 and front chambers 110 can be configured to be air-tight chambers (e.g., via a coated fabric construction) configured to hold inflation fluid for an extended period of time, relatively speaking. At the same time, the rear chambers 142, 144 can be made to release inflation fluid, e.g., through the inclusion of one or more vents or through the porosity of the airbag material (e.g., via an uncoated fabric construction).

Figure 4B:
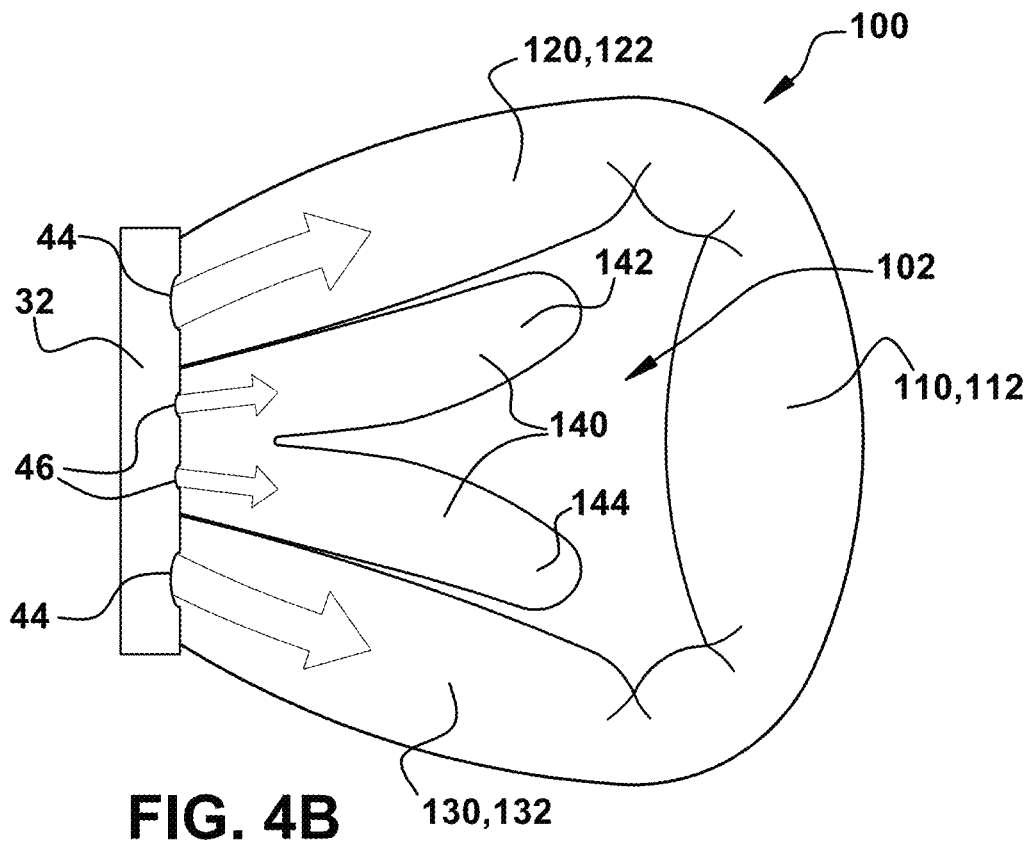

As another example, the inflator 32 itself can be configured to pressurize the chambers to different pressures. Referring to FIG. 4B, the cross-sectional area of flow orifices 44 directing inflation fluid into the side chambers 122, 132 and front chamber 112 can be larger than that of flow orifices 46 directing inflation fluid into the rear chambers 142, 144. The cross-sectional areas of the flow orifices 44, 46 can be configured by adjusting the size and/or number of orifices associated with the different chambers. Because the inflator 32 is configured to generate a predetermined volume of inflation fluid, the cross-sectional areas of the orifices 44, 46 can be configured so that a predetermined portion of that inflation fluid volume will be directed into each wall/chamber of the airbag. Knowing the volume of each wall/chamber allows the resulting pressurization in each wall/chamber to be controlled in a repeatable and reliable manner.

As a further example, the inflator 32 of FIG. 4B can be a two-stage inflator, with a first stage configured to inflate the front chambers 112 and side chambers 122, 132 via the orifices 44, and a second stage configured to inflate the rear chambers 142, 144 via the orifices 46. While the first and second stages of the inflator 32 can be actuated individually, they can be actuated either at the same time or in a staged manner, such as actuating the first stage before the second stage so that the front and side chambers 112, 122, 132 inflate to the first pressure, and the rear chambers 142, 144 inflate thereafter to the second pressure.

When the occupant 20 impacts the airbag 100 in response to a collision, the airbag cushions and rides-down the impacting occupant through the resilient deflection of the sidewalls 120, 130 and fluid displacement in the rear chamber 140. This is shown in FIGS. 5A-5C. As shown in FIG. 5A, when the occupant 20 (represented here schematically with a head H and torso T) initially impacts the airbag 100, the front wall 110 receives the occupant and begins to deflect and conform to the occupant shape. As this occurs, the front wall 110 moves into and begins to close the space 102.

As the occupant 20 continues to move into the airbag 100, the first and second sidewalls 120, 130, begin to bend and deflect, as shown in FIG. 5B. Due to their being inflated to comparatively high pressures, the sidewalls 120, 130 resist this bending and deflection due to the resilience imparted to their structures by the high pressurization of their respective side chambers 122, 132. The elongated tubular/cylindrical configuration of the side chambers 122, 132 helps to produce this high resilience by dividing the sidewalls 120, 130 into a series of parallel tubular/cylindrical chambers 122, 132. The high pressure in the chambers 122, 132 results in high tension on the fabric of the chamber walls which, in turn, increases the stiffnesses of the side chambers. Because deflection of the sidewalls 120, 130 necessarily requires bending/deflection of the chambers 122, 132, the stiffnesses of the side chambers relates directly to the impact-absorbing characteristics of the side walls 120, 130. It will therefore be appreciated that the side chambers 122, 132 act as a series of columns that define their respective sidewalls 120, 130. The bending/deflection of the highly pressurized columns forming the sidewalls 120, 130 require an amount of energy sufficient to significantly slow/cushion/ride-down the occupant 20 impacting the front wall 110. The cushioning and ride-down effect of the occupant 20 can therefore be tailored by tuning the configuration and pressurization of the side chambers 122, 132.

Referring to FIG. 5C, as the impacting occupant 20 moves the front wall 110 further into the space 102, the sidewalls 120, 130 continue to bend and deflect against the resilience imparted through their pressurization. Eventually, the front wall 110 moves into engagement with the rear cushion 140 which, as noted previously, is inflated to a comparatively lower pressure. When this occurs, the rear cushion 140 slows/cushions/rides-down the occupant 20 through displacement of the inflation fluid in the chambers 142, 144. As shown in-FIG. 5C, the split/bifurcated configuration of the chambers 142, 144 can allow them to move away from each other as they are deformed by the impacting occupant 20. As the chambers 142, 144 are compressed by the impacting occupant 20, inflation fluid is displaced and can be expelled through vent(s) and/or through the fabric itself. Through this, the cushioning and ride-down effect of the airbag 100 on the occupant 20 is complete.

To promote the functioning of the airbag 100 in the manner illustrated in FIGS. 5A-5C, the front wall 110, and sidewalls 120, 130 can be configured to bend or deflect in certain areas first, so that continued penetration of the impacting occupant 20 will produce the movement shown in FIGS. 5B and 5C both repeatably and reliably. To promote this, as shown in FIGS. 2 and 3, the airbag 100 can include additional connections 126, 136, such as seams or tethers, that further define the chambers 112, 122, 132, and promote bending or other deflections in a desired manner. At the same time, the connections 126, 136 can also help facilitate the angled transition between the sidewalls 120, 130 and the front wall 110.

FIG. 3 is schematic in nature, in order to convey the arrangement of the panels and connections used to form the airbag 100. The respective shapes, extents, thickness, etc. of the panels and connections is not meant to be limiting and is for purposes of example illustration. For instance, while connections described herein are shown in FIG. 3 as having substantial widths/thicknesses, it should be appreciated that the connections can have varying thicknesses ranging, for example, from a single or double line of stitching, to a tether, laser weld, or OPW seam having an increased width. As shown in FIG. 3, the connections 126, 136 extend generally laterally across the airbag 100. The bends 128, 138 formed in the sidewalls 120, 130 at the transitions between the sidewalls and the front wall 110 are formed along horizontal bend/fold lines which, as shown in FIG. 2, coincide with the connections 126, 136. The connections 126, 136 therefore promote or enforce the inflated generally triangular configuration/profile of the airbag 100.

Additionally, the length of the front wall 110 causes the bends 128, 138 formed in the sidewalls 120, 130 to extend toward each other, as shown in FIG. 2. Because of this, occupant penetration into the airbag 100 causes the bending of the sidewalls 120, 130 to be directed inward toward each other, as shown in FIGS. 5A-5C, which adds to or improves the repeatability and reliability with which the airbag performs.

Figure 6:
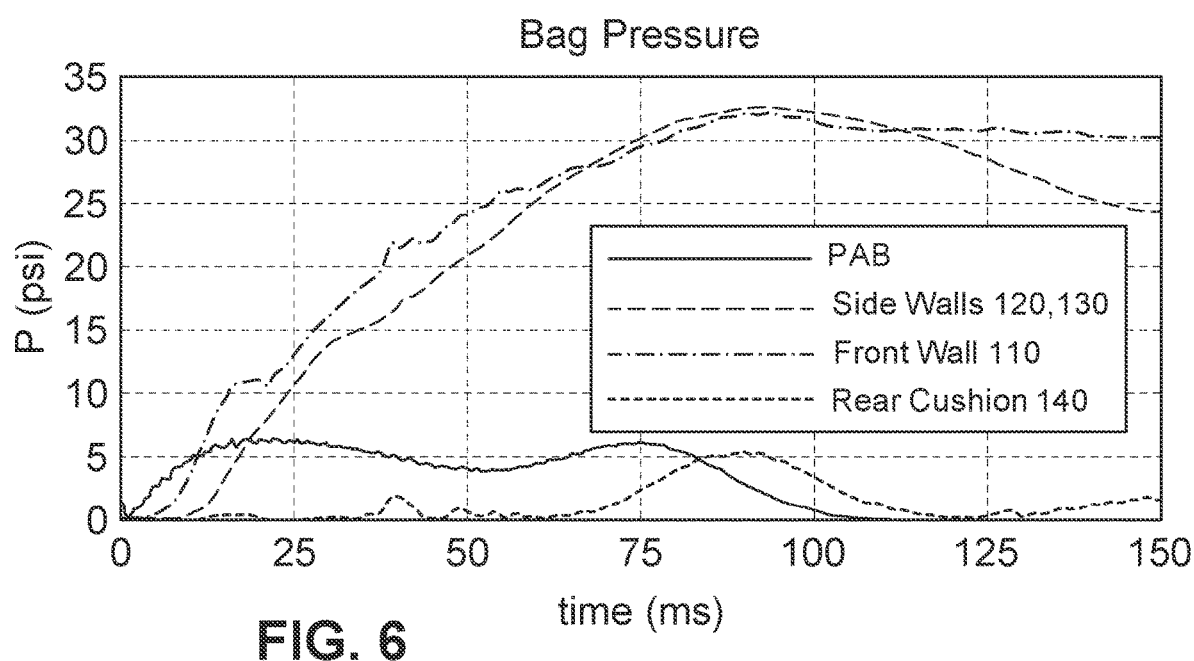
FIGS. 6-8 are graphs illustrating the performance of the low-volume multi-chamber airbag in comparison with a typical passenger airbag (PAB).
Figure 7:
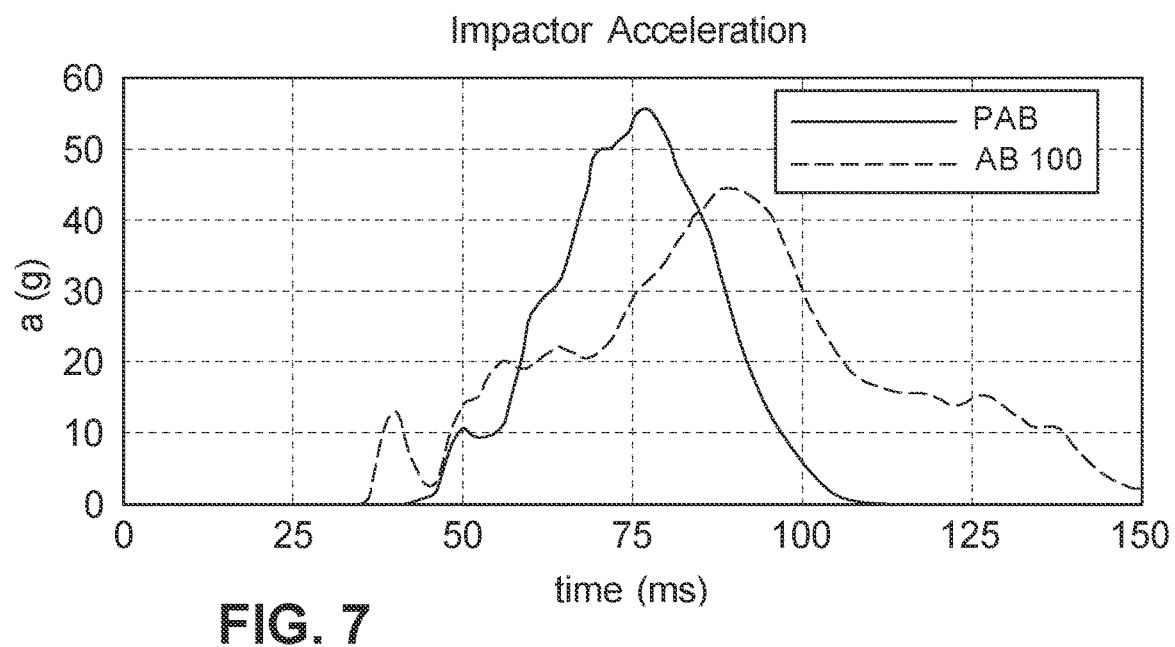
Figure 8:
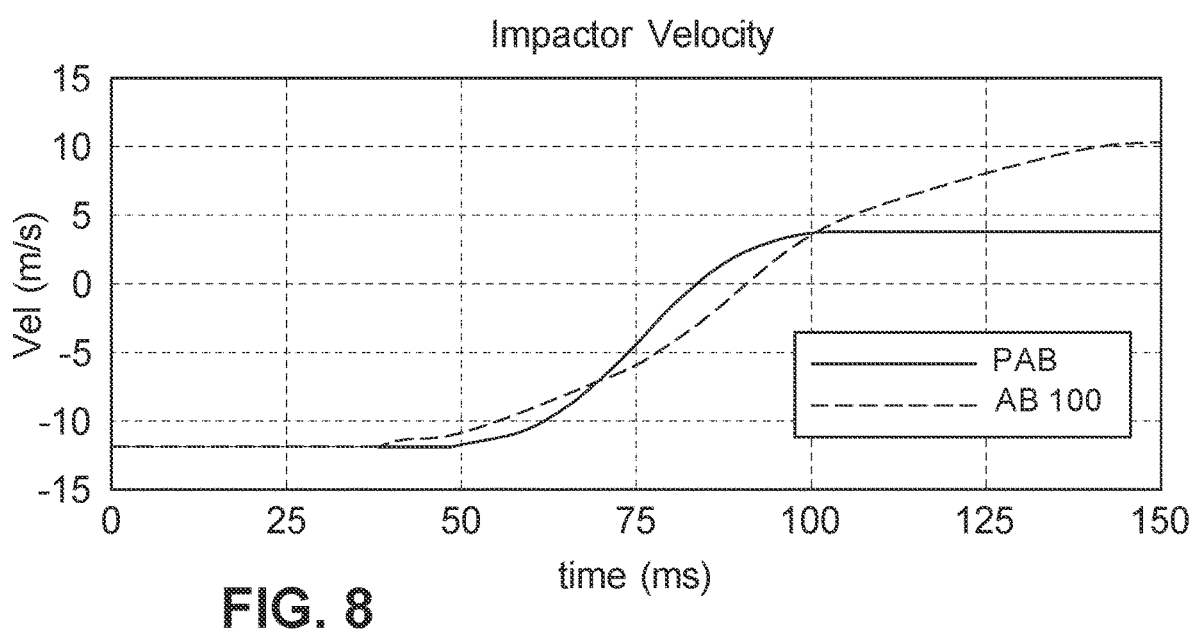

The pressurization and performance of the airbag 100 is simulated and shown in FIGS. 6-8. In these figures, the performance of the airbag 100 is shown with reference to a conventional passenger airbag (PAB) configuration, which has the overall general profile of the airbag shown in FIG. 1, but being formed as a single large volume bag that fills the entire space, i.e., without the open central space 102. FIG. 6 shows the pressurization of the sidewalls 120, 130, the front wall 110, and the rear cushion 140, along with the conventional PAB, for reference. As shown in FIG. 6, both the airbag 100 and the conventional PAB are inflated and pressurized within about 75 milliseconds. The rear cushion 140 inflates about 10 milliseconds or so later, but this is of no consequence since it is not impacted until later in the impact event.

The conventional PAB inflates to about 6 psi, and then depressurizes quickly during the impact event, as the conventional PAB typically has a vented configuration and relies on the venting for cushioning and ride-down. The front wall 110 and sidewalls 120, 130 inflate to about 30 psi and remain largely pressurized thereafter, throughout the duration of the impact event. The rear cushion 140 pressurizes to about 1 psi and exhibits 5 psi peak at about 85-90 milliseconds due to impact. Note here that the sidewalls 120, 130 and front wall 110 remain pressurized throughout the event.

FIGS. 7 and 8 illustrate the acceleration and velocity, respectively, of the occupant 20 (as simulated with an impactor for repeatability and consistency) impacting both the airbag 100 and the conventional PAB. As shown in FIG. 7, the acceleration curve for the conventional PAB is shorter in time, steeper in slope, and taller in magnitude to the acceleration curve for the airbag 100. This proves that the cushioning afforded by the airbag 100 could be superior to that of the conventional PAB.

The steep, high magnitude, short span acceleration with the conventional PAB indicates more abrupt occupant movement-rapidly accelerating to a comparatively high magnitude, followed by an equally sharp deceleration as the conventional PAB absorbs the impact energy, all in a comparatively short time span. The airbag 100, on the other hand produces a less steep, more gradual acceleration over a longer duration, due to the resilience of the deflecting sidewalls 110, 120, which begin decelerating the occupant soon after impact. The deceleration that occurs after the peak acceleration is gradual and spread out over 50+ milliseconds after the conventional PAB event is ended. The airbag 100 therefore provides a less violent, less severe cushioning and ride-down of the impacting occupant.

The velocity of the impacting occupant (FIG. 8) confirms that the airbag 100 provides improved performance over the conventional PAB. As shown, the conventional PAB produces a steep velocity slope, indicating an abrupt shift in the velocity of the occupant which, again, is consistent with a more violent, severe cushioning and ride-down performance. In contrast, the occupant velocity when impacting the airbag 100 is lower in slope, i.e., smooth and drawn out, making a more gradual reduction in velocity to 0 m/s, followed by a rebound velocity that increases in a more gradual manner.

Figure 9:
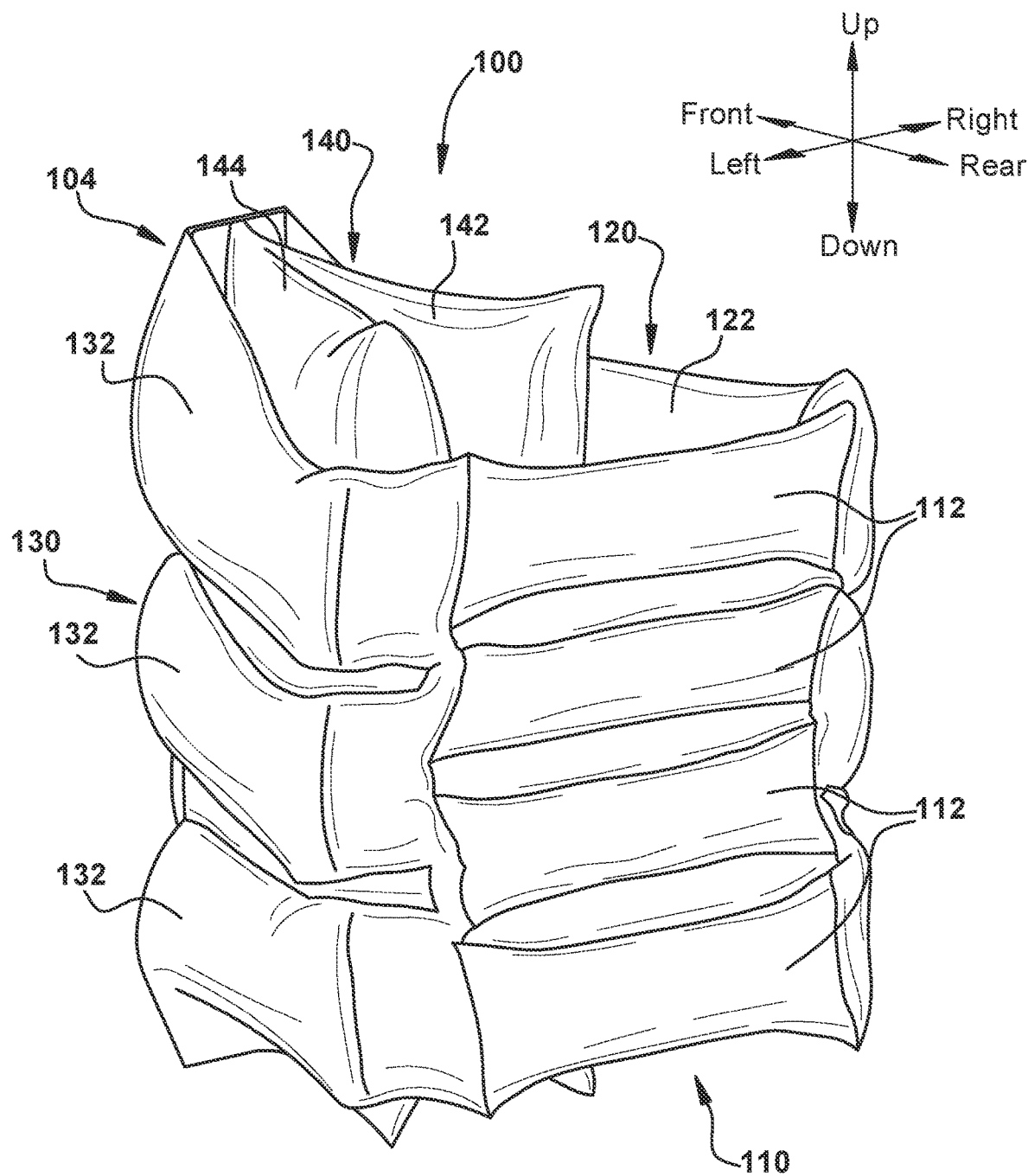
FIGS. 9 and 10 are perspective views of low-volume multi-chamber airbags according to additional example configurations.

A second example configuration of the airbag 100 is shown in FIG. 9. The construction of the airbag 100 according to the example configuration of FIG. 9 can be similar or identical to the construction of the airbag according to the example configuration of FIGS. 1-3. The only difference in the example configuration of FIG. 9 is that the airbag 100 is rotated 90 degrees. The front chambers 112 of the front wall 110 thus extend horizontally with respect to the occupant, and the side chambers 122, 132 of the sidewalls 120, 130 extend laterally toward opposite sides of the occupant. The rear chambers 142, 144 of the rear cushion 140 are positioned between the sidewalls 120, 130.

Performance-wise, the airbag 100 of FIG. 9 is on par with that depicted in FIGS. 1-3. The main difference is that the configuration of FIG. 9 might be better suited for lateral or oblique impact applications because the airbag throat 104 and the inflator extend vertically with respect to the occupant, which makes it possible for the airbag 100 to pivot left/right to account for the angles involved in the side/oblique impact.

Figure 10:
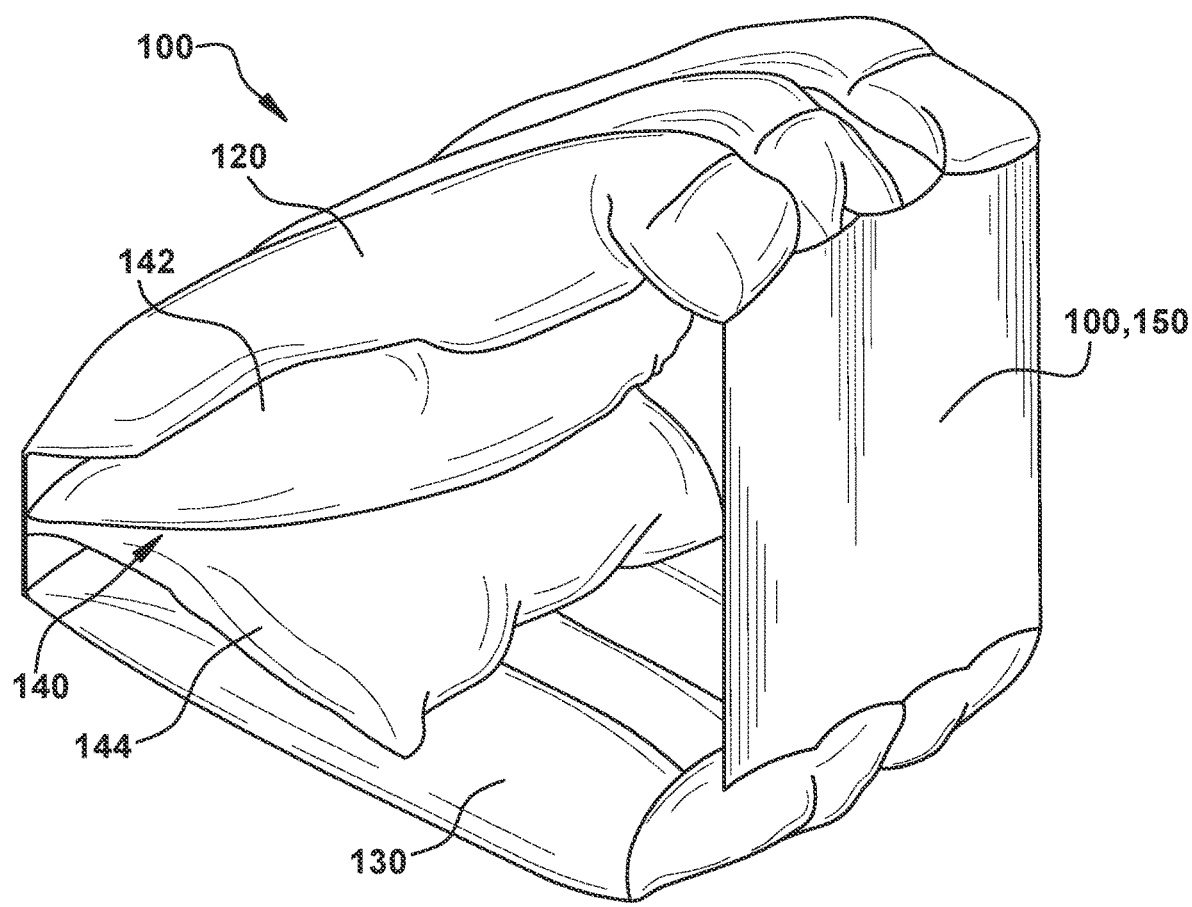

A third example configuration of the airbag 100 is shown in FIG. 10. The construction of the airbag 100 according to the example configuration of FIG. 10 can be similar or identical to the construction of the airbag according to the example configurations of FIGS. 1-3 and/or 9. The only difference in the example configuration of FIG. 10 is that, instead of being formed by inflatable chambers, the front wall 110 is formed by a sheet 150 of material, such as airbag fabric. The sidewalls 120, 130 are identical to the previous example configurations and therefore can perform on par with those configurations. In this configuration, the sidewalls 120, 130 are configured to apply a tension to the sheet forming the front wall 110.

In the example configurations of FIGS. 1-2 and 9, the pressurization of the front wall 110 might not contribute largely to the cushioning and ride-down performance of the airbag 100. Therefore, it can be advantageous to configure the front wall 110 as a non-inflatable sheet as shown in FIG. 10. This reduces the size of the inflator required to inflate and deploy the airbag 100 and also can result in a faster deployment, without sacrificing cushioning performance. Therefore, the performance of the example configuration of FIG. 10 can be commensurate with the performance illustrated in FIGS. 6-8.

As another example, the airbag 100 can include more than two side walls or the side walls can be shaped/configured in a manner different than the illustrated flat/planar cushion arrangement with parallel, longitudinally extending chambers, as illustrated in the FIGS. For example, the side walls can have a curved configuration, with chambers that extend parallel to each other but arranged to face concavely toward the central space in which the rear chamber is positioned. In this manner, the curved configurations of the side walls could reduce the size of the openings on either side of the central space or even close those openings. These alternative configurations could be implemented to provide tailored side bending support. This could, for example, be beneficial in crash scenarios that result in oblique occupant movements, such as angular or offset collisions. In these configurations, the rear cushion and the rear chambers could be configured to conform to the shapes/configurations of the side walls.

The airbag configurations illustrated in FIGS. 1-10 can produce several advantageous features/qualities. For example, the inflatable volume of the airbag 100 over that of a conventional PAB designs can be reduced up to 50% or more, depending on the specific configurations of both the airbag and the vehicle. The reduction in airbag volume can help reduce the inflator size, i.e., the mass of the inflation fluid required to be discharged from the inflator, by up to 35% or more. All of this can be achieved without negatively affecting the impact absorbing and cushioning performance of the airbag. In fact, as shown and described herein, the airbag can exhibit even improved performance over conventional PAB designs.

Additionally, the walled design of the airbag 100 is highly tunable through the respective configurations of the walls 110, 120, 130, the chambers 112, 122, 132 forming the walls, and the rear cushion 140 and its chambers 142, 144. The walls 110, 120, 130 are essentially uniform laterally, i.e., in the right-left direction, with the differentiation stemming from chamber parameters, such as the diameters and/or lengths of the chambers 112, 122, 132, which determine the angles at which the walls extend and the bending moments that will result from impacts. Pressurization of the chambers 112, 122, 132 is another tunable parameter that, along with the diameter and length, affect the stiffnesses of the side walls 120, 130 and the cushioning effect of the front wall 110. This renders the airbag 100 highly tunable through the selection of these chamber parameters.

From the above description of the invention, those skilled in the art will perceive improvements, changes, and modifications. These improvements, changes, and modifications within the skill of the art are intended to be covered by the appended claims.

Having described the invention, the following is claimed:

1. An apparatus for helping to protect an occupant of a vehicle, comprising:
   an airbag configured to be mounted at a mounting location on a vehicle mounting structure, the airbag comprising:
   a front wall configured to receive the occupant;
   inflatable sidewalls connected to the front wall; and
   an inflatable rear cushion,
   wherein the sidewalls are configured to extend from the front wall to a throat of the airbag at the mounting location, the front wall and the sidewalls delimiting a non-inflatable central space located behind the front wall and between the sidewalls, wherein the rear cushion is positioned in the central space between the throat and the front wall, wherein the sidewalls are configured to receive inflation fluid via the throat and to deliver the inflation fluid to the front wall, and wherein the rear cushion is configured to receive inflation fluid via the throat separately from the sidewalls.

2. The apparatus recited in claim 1, wherein the front wall is configured to be displaced toward the rear cushion in response to receiving the occupant and wherein the rear cushion is configured to dampen the movement of the front wall and the occupant.

3. The apparatus recited in claim 2, wherein the front wall is configured to close the central space when it is displaced toward the rear cushion.

4. The apparatus recited in claim 2, wherein the sidewalls are configured to bend and deflect in response to the front wall being displaced toward the rear cushion, the bending and deflection of the sidewalls being configured to dampen displacement of the front wall.

5. The apparatus recited in claim 1, wherein the front wall is inflatable and is configured to be in fluid communication with the sidewalls, the front wall being inflatable with inflation fluid received from the sidewalls.

6. The apparatus recited in claim 1, wherein the front wall comprises a plurality of inflatable front chambers, and the sidewalls comprise a plurality of inflatable side chambers.

7. The apparatus recited in claim 6, wherein the front chambers are elongated, tubular, and extend parallel to each other, and the side chambers are elongated, tubular, and extend parallel to each other.

8. The apparatus recited in claim 1, wherein the front wall comprises a non-inflatable sheet of material, wherein the sidewalls are configured when inflated to tension the front wall.

9. The apparatus recited in claim 1, wherein the airbag comprises a passenger frontal airbag configured to be mounted in or on a vehicle instrument panel, wherein one of the sidewalls is configured to extend generally upward and rearward in the vehicle, another of the sidewalls is configured to extend generally downward and rearward in the vehicle, and the front wall is configured to extend generally vertically in the vehicle between the sidewalls.

10. An airbag module comprising:
    the apparatus recited in claim 1,
    an inflator for inflating the airbag; and
    a housing for supporting the inflator and the airbag in a deflated and stored condition.

11. A vehicle safety system comprising:
    the airbag module recited in claim 10;
    at least one crash sensor; and
    a controller configured to control the actuation of the inflator in response to the at least one crash sensor.

12. An apparatus for helping to protect an occupant of a vehicle, comprising:
    an airbag configured to be mounted at a mounting location on a vehicle mounting structure, the airbag comprising:
    a front wall configured to receive the occupant;
    inflatable sidewalls connected to the front wall; and
    an inflatable rear cushion,
    wherein the sidewalls are configured to extend from the front wall to a throat of the airbag at the mounting location, the front wall and the sidewalls delimiting a non-inflatable central space located behind the front wall and between the sidewalls, wherein the rear cushion is positioned in the central space between the throat and the front wall, wherein the sidewalls are configured to be inflated to a first pressure, and the rear cushion is configured to be inflated to a second pressure that is substantially less than the first pressure.

13. The apparatus recited in claim 12, wherein the first pressure is about 20-50 psi and the second pressure is about 1-5 psi.

14. The apparatus recited in claim 12, wherein the first pressure is about 30 psi and the second pressure is about 1 psi.

15. The apparatus recited in claim 12, wherein the throat is configured to direct a first volume of inflation fluid into the sidewalls and a second volume of inflation fluid into the rear cushion, the first and second volumes being configured to produce the first and second pressures.

16. The apparatus recited in claim 12, further comprising an inflator that is actuatable to provide inflation fluid for inflating the airbag, wherein the inflator is configured to discharge a first volume of inflation fluid into the sidewalls and a second volume of inflation fluid into the rear cushion, wherein the first and second volumes are configured to produce the first and second pressures.

17. The apparatus recited in claim 12, further comprising an inflator that is actuatable to provide inflation fluid for inflating the airbag, wherein the inflator comprises first and second actuatable stages, the first stage configured to discharge a first volume of inflation fluid into the sidewalls, the second stage being configured to discharge a second volume of inflation fluid into the rear cushion, wherein the first and second volumes are configured to produce the first and second pressures.

18. An apparatus for helping to protect an occupant of a vehicle, comprising:
  an airbag configured to be mounted at a mounting location on a vehicle mounting structure, the airbag comprising:
  a front wall configured to receive the occupant;
  inflatable sidewalls connected to the front wall; and
  an inflatable rear cushion,
    wherein the sidewalls are configured to extend from the front wall to a throat of the airbag at the mounting location, the front wall and the sidewalls delimiting a non-inflatable central space located behind the front wall and between the sidewalls, wherein the rear cushion is positioned in the central space between the throat and the front wall, wherein the rear cushion comprises an inflatable first rear chamber positioned adjacent to a sidewall and an inflatable second rear chamber inflatable adjacent to another sidewall.

19. The apparatus recited in claim 18, wherein, in response to the front wall being displaced into engagement with the rear cushion, the first and second rear chambers are configured to dampen movement of the front wall through at least one of inflation fluid displacement and venting.

20. The apparatus recited in claim 18, wherein the first and second rear chambers are configured to move away from each other in response to the front wall being displaced into engagement with the rear cushion.

21. The apparatus recited in claim 18, wherein the rear cushion has a shape and volume configured to tailor fluid displacement in response to an impact in order to cushion the impact.

\* \* \* \* \*